United States Patent [19]

Szyms et al.

[11] Patent Number: 4,877,469

[45] Date of Patent: Oct. 31, 1989

[54] REINFORCED TIRE CURING BLADDER AND METHOD FOR USING SAME

[75] Inventors: Walter Szyms, Branford; Joseph W. Valaitis, Guilford, both of Conn.

[73] Assignee: The Armstrong Rubber Company, New Haven, Conn.

[21] Appl. No.: 230,735

[22] Filed: Aug. 10, 1988

Related U.S. Application Data

[63] Continuation of Ser. No. 27,448, Mar. 18, 1987, abandoned.

[51] Int. Cl.⁴ .................. B29D 23/00; B29D 30/08
[52] U.S. Cl. .................................. 156/123; 156/416; 264/326; 425/52
[58] Field of Search ............... 156/416, 123, 133, 120; 264/326, 501; 425/42, 43, 45, 52, 53, 44, DIG. 14

[56] References Cited

U.S. PATENT DOCUMENTS

| | | | |
|---|---|---|---|
| 1,286,107 | 11/1918 | Renner | 156/416 X |
| 1,607,356 | 11/1926 | McMahan | 425/52 |
| 2,305,412 | 12/1942 | Frolich et al. | 152/450 X |
| 2,582,715 | 1/1952 | Murray | 425/53 |
| 3,101,289 | 8/1963 | Giletta et al. | 156/416 X |
| 3,144,374 | 8/1964 | Saint Paul | 156/416 |
| 3,547,734 | 12/1970 | Read | 156/416 |
| 3,922,188 | 11/1975 | Appleby | 156/416 |
| 3,963,394 | 6/1976 | Shichman et al. | 156/416 X |
| 3,979,249 | 9/1976 | Nicholls et al. | 156/416 |
| 3,990,930 | 11/1976 | Schmit | 156/123 |

Primary Examiner—Raymond Hoch
Attorney, Agent, or Firm—St. Onge Steward Johnston & Reens

[57] ABSTRACT

A thin, membrane-like cylindrical rubber tire curing bladder is provided with reinforcing cords wound in parallel spiral paths at any composite angle to the longitudinal axis of the cylinder. When installed on the centerpost mechanism of a tire curing press and inflated in the curing process, the bladder length increases due to partial and reversible straightening of the spirally wound cord reinforcement. This permits optimum fit of the bladder in the tire being cured with uniform controlled growth of the membrane. Longer service life of the bladder is thereby achieved. The bladder is a good heat conductor inherent to its thin matrix, unlike previously known curing bladders.

11 Claims, 2 Drawing Sheets

4,877,469

REINFORCED TIRE CURING BLADDER AND METHOD FOR USING SAME

This a continuation of co-pending application Ser. No. 07/027,448 filed on Mar. 18, 1987, now abandoned.

BACKGROUND OF THE INVENTION

1. Field of the Invention

This invention relates to tire curing bladders and is more particularly concerned with an improved tire curing bladder and with a method for curing tires utilizing said bladder.

2. Description of the Prior Art

It is well-known in the art to shape and cure tire carcasses in a mold using a bladder which contains the curing heat medium and pressure within the carcass to hold the exterior of the latter in contact with the mold during the curing process.

Gostlin U.S. Pat. No 1,378,172 shows an early and primitive bladder curing process in which the exterior of carcass was not confined within a mold. In this method the carcass and the inner bladder (which resembles a conventional inner tube) are placed on a sectional base ring having annular shoulders to hold the bead portions of the carcass in place and having a central annular groove adapted to receive the inner edge of the bladder accurately centered in place. The bladder is inflated to round out the carcass and maintain it under proper tension while being cured. This method lacks the precision and reproducibility of the configurations now demanded of tires to be employed under present conditions as well as requiring an economically unacceptable amount of time and labor to cure the tire carcass.

Semler U.S. Pat. No 1,910,128 describes the use of an air bladder or inner tube which has incorporated therein a heating element to apply heat to the inside of a tire carcass while the latter, encased in a mold, is being cured in a steam kettle.

Frolich et al. U.S. Pat. No. 2,305,412 describes the use of a fabric reinforced air bag resembling an inner tube which is inflated within a tire carcass during the curing process.

Saint Paul U.S. Pat. No. 3,144,374 teaches the use of a cylindrical membrane reinforced with spring steel wires and adapted to be stretched between the flanges of the drum of a tire building machine. The membrane can be deformed to a toroidal shape for constructing uncured tire carcasses. The membrane has limited extensibility in the axial direction of the cylinder due to the limited extensibility of the metal wire reinforcement. In one embodiment the reinforcement comprises a plurality of undulating wires i.e. wires having ,a sine wave configuration. The membrane is not designed for use in a curing process.

Read U.S. Pat. No. 3,547,734 describes a tire building (as opposed to tire curing) air bag fabricated from multiple layers of rubber which have sandwiched therein a reinforcing layer of cords forming a lattice-work pattern with cords aligned in one direction overlapping cords aligned in a different direction, the angle at which the layers of cord cross each other being as much as 45°.

Shichman et al U.S. Pat. No. 3,963,394 teaches an expandable bladder for shaping radial ply uncured tire carcasses which has a relatively thick center section and a multiplicity of thinner convolutions. This design provides controlled amounts of extensibility axially. Reinforcing material which can be aramid or steel cords is provided through the center section and end sections of the bladder.

Nicholls et al U.S. Pat. No. 3,979,249 describes an inflatable air bag for tire building machines which has inextensible reinforcing elements, comprising steel, glass fiber and like cords, in part of the width thereof to limit the expansion of the bag in the reinforced areas thereby controlling the shape which the bag assumes upon inflation.

Schmidt U.S. Pat. No. 3,990,930 shows a bladder for use with a tire building drum. The bladder is prepared by first forming a partially cured membrane reinforced with parallel cords running axially. The central portion of the membrane is expanded and has a circumferentially extending belt, optionally reinforced with lattice type material.

MacMillan U.S. Pat. No. 4,030,863 is concerned with providing a separate venting retainer for a cylindrical tire curing bladder. The retainer comprises a net-like cylinder which surrounds the exterior of the bladder and permits escape of air trapped between the inner surface of the tire carcass and the exterior surface of the expanded bladder during the curing operation.

Burley U.S. Pat. No. 4,249,979 describes a fabric reinforced inflatable bladder provided with a ply-folding wedge on its surface and adapted to fold the edges of unvulcanized rubberized ply material around bead wire bundles and the like in the process of building a tire.

We have now found that a tire curing membrane having significantly improved construction and properties can be obtained by providing a membrane with a particular type and configuration of reinforcement not hitherto taught or suggested by any of the prior art discussed above.

SUMMARY OF THE INVENTION

It is an object of the invention to provide a tire curing bladder having controlled stretch characteristics.

It is a further object of the invention to provide a tire curing bladder which gives optimum fit in the tire carcass to be cured while undergoing an exact minimal stretch.

It is yet another object of the invention to provide a tire curing bladder which has improved service life and heat transfer.

These objects, and other objects which will become apparent from the description which follows, are achieved by the tire curing bladder of the invention. The latter, in its broadest aspect, comprises a cylindrical membrane of rubber having embedded therein a layer of reinforcing material. The reinforcing material comprises a plurality of cords of polymeric material traversing parallel spiral paths within the cylinder of rubber.

DETAILED DESCRIPTION OF THE INVENTION

Figure 1:
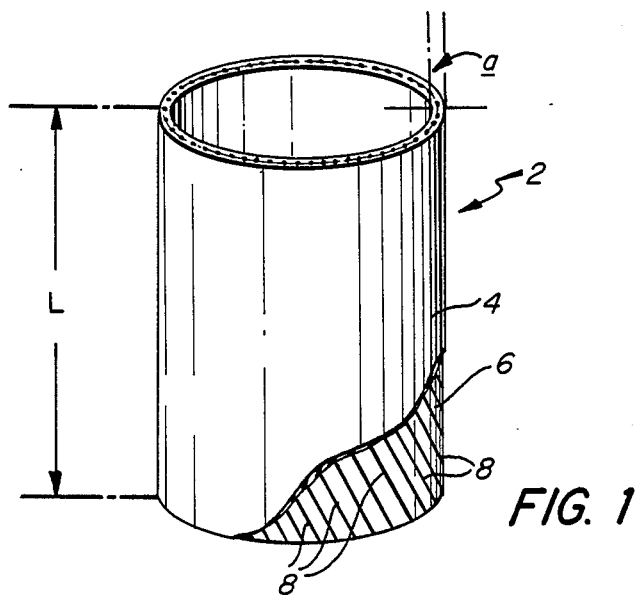
FIG. 1 is a side elevational perspective view, partially cut away, of an embodiment of a tire curing membrane or bladder in accordance with the invention.

The invention will now be described with reference to the embodiments shown in the accompanying drawings. A tire curing bladder in accordance with the invention is shown broadly as 2 in partial cutaway in FIG. 1. The bladder 2 is an open cylinder comprising outer and inner layers 4 and 6, respectively, of rubber sheet between which are sandwiched a plurality of reinforcing cords 8. The latter are disposed in parallel relationship and each follows a spiral path as illustrated. Advantageously the path followed by cords 8 is inclined at an angle of about 0° to about 60° with respect to the longitudinal axis of the bladder 2. Preferably the angle of inclination of the cords with respect to said axis is in the range of about 20° to about 45°. The number of cords per inch of the circumference of the bladder 2 is advantageously of the order of about 2 to about 50 and preferably is of the order of about 10 to about 32.

The thickness of the wall of the membrane bladder 2 is advantageously of the order of about 0.075 inches to about 0.2 inches and preferably of the order of about 0.09 to about 0.12 inches. The thickness chosen in any given instance is a function of the size of tire carcass to be cured.

The cords 8 can be of any of a variety of materials such as steel wire, glass fiber, polymeric materials such as polyamides, polyimides and the like. Advantageously the cords 8 are of a denier of the order of about 400 to about 3500 and are composed of polymeric fibers. In a preferred embodiment of the invention the cords 8 are composed of aramid fibers of which those available under the trademarks "Fiber B" and "Kevlar" are typical. Aramid is a generic name for the condensation product of isophthalic or terephthalic acid and m- or p-phenylene diamine.

The length L of the tire bladder 2 is so chosen as to be equal to or slightly less than that of the inside cross-sectional periphery of the tire which is to be cured, as will be discussed in more detail below.

Figure 2:
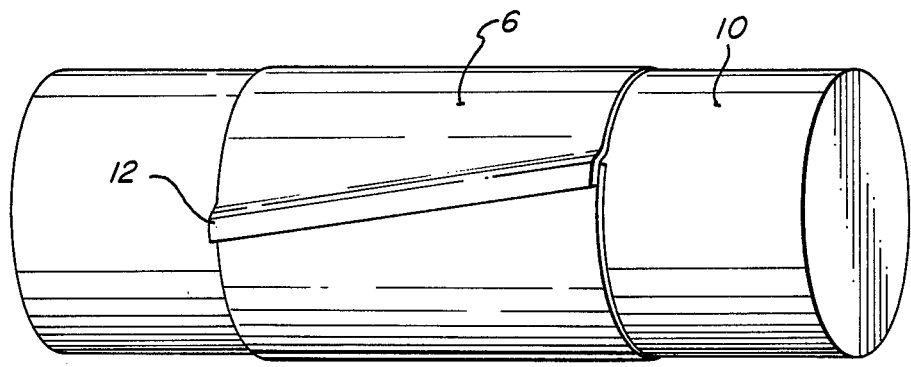
FIG. 2 is a perspective view showing a first stage in the preparation of a curing membrane or bladder in accordance with the invention.
Figure 3:
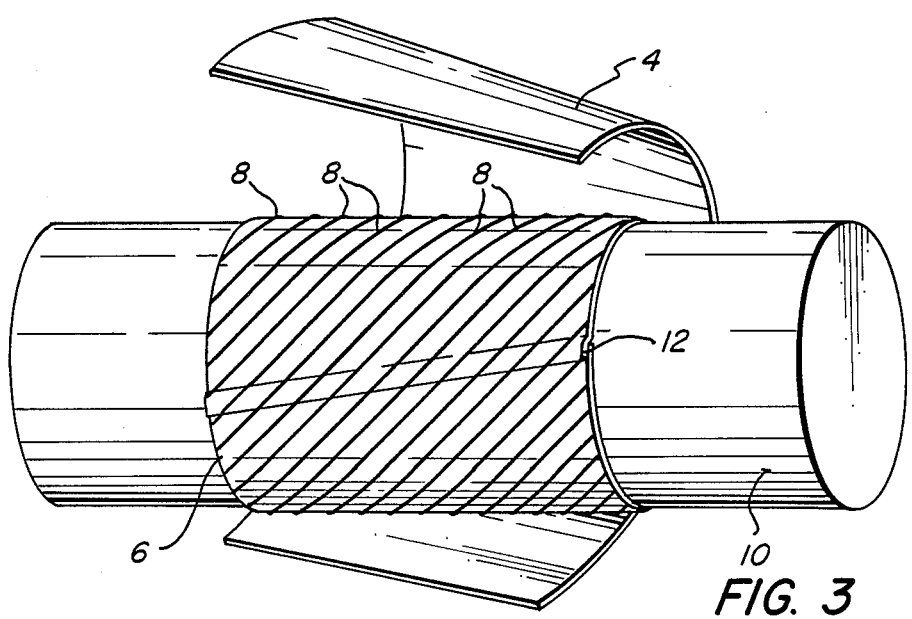
FIG. 3 is a perspective view showing a second stage in the preparation of a curing membrane or bladder in accordance with the invention.

The method of fabricating a reinforced tire membrane bladder in accordance with the invention is illustrated in FIGS. 2 and 3. In the first step of the process a rubber layer 6 is assembled on a forming drum 10. The rubber employed in layer 6 advantageously is butyl rubber. The two ends of the layer are overlapped slightly as shown at 12 to form a seam. In the second step of the method, the reinforcing cords 8 are assembled in parallel spiral paths over the entire length of the layer 6. Optionally the cords 8 have been coated previously with rubber or like bonding agents to ensure satisfactory adhesion of the reinforcing material, in the ultimate curing step, to the layer 6 and a second layer 4 which is to be assembled in the next step. Advantageously the cords 8 are calendered on to the layer 6 using conventional calendering means and techniques. The cords 8 are aligned in paths which form an angle with respect to the longitudinal axis of the forming drum 10 as discussed above.

A second rubber layer 4 which also is advantageously butyl rubber is then assembled over the cords 8 and layer 6. The ends of the second layer overlap slightly to form a seam in the same manner as shown and described for layer 6. The location of the same is so chosen that it does not coincide with the seam 12 on layer 6. Preferably the two seams are located in diametrically opposed positions in the finished tire bladder or membrane.

The final step of the process comprises curing the tire bladder assembly using conventional procedures such as heat, time and pressure.

Figure 4:
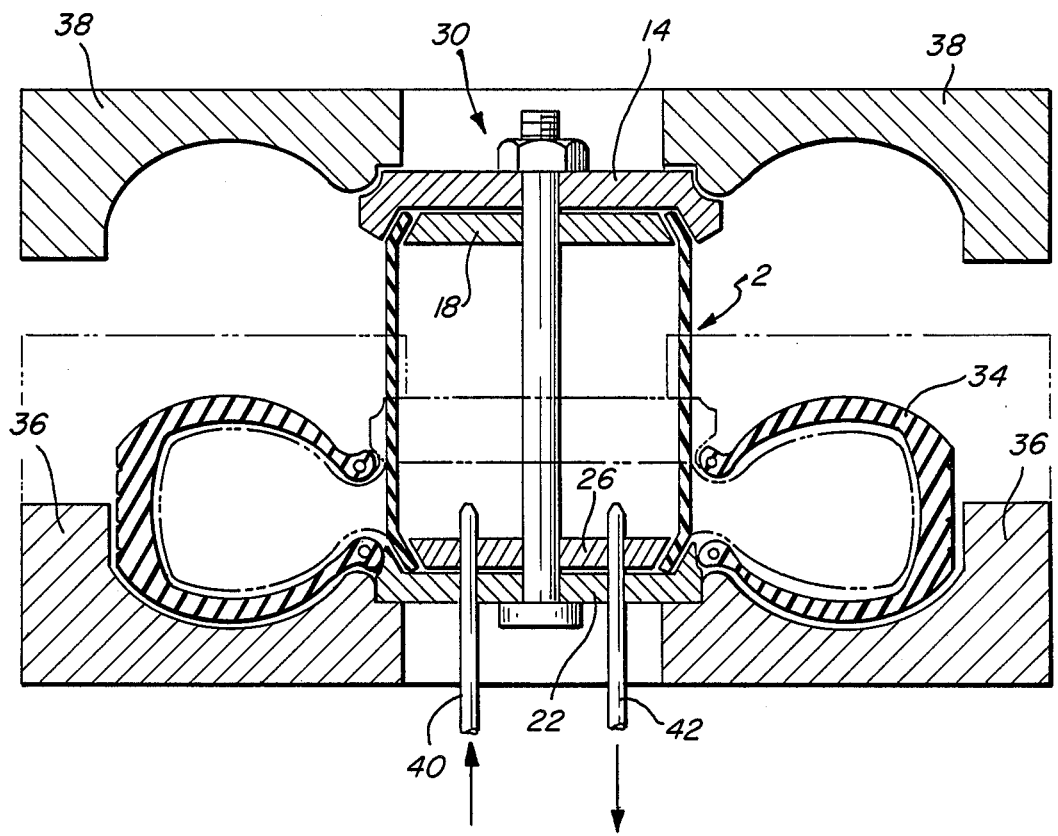
FIG. 4 is a cross-sectional view of a curing membrane or bladder in accordance with the invention installed in a tire curing apparatus.

FIG. 4 shows the tire membrane bladder 2 in accordance with the invention mounted on the centerpost assembly of a conventional automatic tire curing apparatus. One end of the membrane bladder 2 is secured around its periphery between the outer locking flange 14 and the cooperating inner flange 18. The other end of tire membrane or bladder 2 is secured in similar manner around its periphery between the outer flange 22 and the inner cooperating flange 26. Both cooperating pairs of flanges are held securely together by fastening means such as nuts and bolts (not shown). The flange 14 and cooperating flange 18 can be moved downwardly to the position shown in dotted lines by operating the automatic press or centerpost 30. As the flange 14/18 assembly is lowered in this manner the walls of the membrane or bladder 2 gradually assume the toroidal cross-sectional profile as internal pressure is introduced as shown in dotted lines in the final downward position of the flange 14/18 assembly. The membrane bladder is thereby disposed within the interior of uncured tire carcass 34 which is held between the two halves 36 and 38 of a tire mold. The upper half 38 of the mold is brought into cooperation with the lower half 36 at the same time as the flange 14/18 assembly is lowered into the position shown in dotted lines or subsequently thereto.

The membrane bladder 2, when it has assumed the configuration shown in dotted lines, is in contact with the inner wall of the tire carcass 34. When the mold halves 36 and 38 have been brought together and secured in place, the tire bladder 2 is inflated, using steam and like fluids through inlet nozzle 40, so as to make contact with the inner wall of the tire carcass over all the abutting surfaces of the two members. The pressure thus exerted on the inner wall of the carcass serves to hold the outer surface of the latter in intimate contact with the inner wall of the mold. The tire carcass 34, having been encapsulated in the above manner in the mold and secured therein by inflation of membrane bladder 2 is then cured by application of heat to, and through, the mold. One of the advantages of the membrane bladder 2 of the invention is that, because of its thin walls, it is a very satisfactory conductor of heat. Heat can thereby be transmitted to the carcass 34 by introducing steam or other heat medium via inlet nozzle 40 with controlled venting through exit nozzle 42.

A further advantage of the membrane bladder 2 is that inflation thereof in the curing step tends to cause the spirally wound reinforcing cords 8 (see FIG. 1) to straighten out and assume or seek to assume a configuration which parallels the longitudinal axis of the bladder. This re-orientation of the reinforcing cords permits the side wall of the membrane bladder to be extended by a limited, controlled amount. In general the amount by which the bladder can be extended in this manner depends upon the particular initial configuration and angle of the spirally wound reinforcing cords. Because the amount of extension is controlled in this manner it is possible to choose the appropriate length L (see FIG. 1) of the membrane bladder which is to be used in the curing of any given size tire interior periphery. Thus, in general the desirable length L of the membrane bladder may be equal to or less than the inside cross-sectional periphery of the tire in its cured configuration. In a preferred embodiment which has been found to give optimum results the length L of the membrane bladder has a specific dimension, depending on the particular orientation of reinforcing cords, which equals or is less than the inside cross-sectional peripheral dimension of the cured tire. However, other valves of L ranging from a length equal to that of the inside peripheral dimension of the tire to a length substantially less than said dimension can be employed, if desired. Thus the length of curing membrane bladder used in any given instance can be tailored to fit the particular size of tire being cured.

In a particular embodiment of the invention, an extended length of reinforced cylindrical curing membrane bladder prepared in accordance with the invention is provided from which appropriate lengths can be cut for use in curing any given size of tire carcass. Further, the nature and particular configuration of the reinforcing cords 8 employed in the curing membrane bladders of the invention serve to ensure that the configuration of the bladder assumed upon inflation thereof is uniform and does not change even after repeated use. It is found that the average working life of a curing membrane bladder in accordance with the invention is significantly greater than that of bladders previously employed whether these be unreinforced or reinforced with knitted fabric and like types of reinforcement previously employed in the art.

By reason of the increased heat conductivity of the curing membrane bladders of the invention, which permits transmittal of heat to the tire carcass from the inside in addition to heat supplied through the tire mold, it is possible to reduce the overall time required to cure the tire carcass. The overall productivity of the given tire curing process is thereby increased.

These advantages, and other advantages which will be apparent to one skilled in the art, are clearly beneficial and enable the process of curing tire carcasses to be carried out with a marked increase in productivity coupled with reduced complexity of equipment required in the curing process without sacrifice of quality and accuracy of configuration of the tires so cured.

While the invention has been described with reference to certain specific embodiments thereof it is to be understood that these have been given for purposes of illustration only and are nor to be construed as limiting. Modifications which can be made thereto without departing from the scope of the invention will be readily apparent to one skilled in the art.

What is claimed is:

1. In a method of shaping and curing a tire wherein the carcass of the tire to be cured is supported in a mold, a tire curing membrane bladder is inflated within said carcass to hold the latter in place against the walls of said mold, and heat is applied to said carcass to cure the same, the improvement which comprises employing as the tire curing bladder, a bladder which, in the uninflated condition, comprises a cylindrical membrane of rubber having embedded therein a layer of reinforcing material comprising a plurality of cords traversing parallel spiral paths within said cylinder of rubber and which, in the inflated condition within said carcass, assumes a toroidal cross-sectional profile wherein said cords are aligned substantially in the direction of the longitudinal axis of said bladder.

2. An improved tire curing membrane bladder which, in the uninflated condition, comprises a cylindrical membrane of rubber having embedded therein a layer of reinforcing material and which, in the inflated condition when used in a tire curing assembly, assumes a toroidal cross-sectional profile;

said reinforcing material comprising a plurality of cords which, in the uninflated condition of said bladder, transverse parallel spiral paths within said cylinder of rubber and which, in the said inflated condition of said bladder, are aligned substantially in the direction of the longitudinal axis of said bladder.

3. An improved tire curing membrane bladder according to claim 1 wherein the said cords traverse a spiral path inclined at any composite angle with respect to the longitudinal axis of said cylinder.

4. An improved tire curing membrane bladder according to claim 1 wherein the average thickness of said bladder is of the order of about 0.075 to about 0.20 inches.

5. An improved tire curing membrane bladder according to claim 1 wherein said reinforcing material comprises aramid cord.

6. An improved tire curing membrane bladder according to claim 5 wherein said aramid cord has a denier in the range of about 400 to about 3500.

7. An improved tire curing membrane bladder according to claim 1 wherein said rubber is butyl rubber.

8. An improved tire curing membrane bladder which, in the uninflated condition, comprises a cylindrical membrane of rubber having embedded therein a layer of reinforcing material and which, in the inflated condition when used in a tire curing assembly, assumes a toroidal cross-sectional profile;

said reinforcing material comprising cords of aramid which, in the uninflated condition of said bladder, traverse parallel spiral paths within said cylinder, said paths being inclined at an angle to the longitudinal axis of said cylinder, and which, in the said inflated condition of said bladder, are aligned substantially in the direction of the said longitudinal axis.

9. An improved tire curing membrane bladder according to claim 8 wherein said reinforcing material comprises aramid cords having a denier in the range of about 400 to about 3500.

10. An improved tire curing membrane bladder according to claim 8 wherein said rubber is butyl rubber.

11. An improved tire curing membrane bladder according to claim 8 wherein the average thickness of said bladder is of the order of about 0.075 to about 0.20 inches.

* * * * *